(12) United States Patent
Shimizu et al.

(10) Patent No.: US 6,501,814 B1
(45) Date of Patent: Dec. 31, 2002

(54) DRY RADIOACTIVE SUBSTANCE STORAGE FACILITY

(75) Inventors: Masashi Shimizu, Hitachi (JP); Koichi Maki, Tokai-mura (JP); Keiichiro Shibata, Hitachi (JP); Masashi Oda, Hitachi (JP); Naoki Kumagai, Hitachi (JP); Hidetoshi Kanai, Jyuou-machi (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/961,299

(22) Filed: Sep. 25, 2001

Related U.S. Application Data

(62) Division of application No. 09/468,317, filed on Dec. 21, 1999.

(30) Foreign Application Priority Data

Dec. 24, 1998  (JP) .......................... 10-366317
Dec. 25, 1998  (JP) .......................... 10-368951

(51) Int. Cl.$^7$ .............................................. G21C 15/26
(52) U.S. Cl. .................... 376/276; 376/347; 250/506.1; 250/507.1; 250/515.1; 250/517.1; 250/496.1; 250/503.1
(58) Field of Search ................................ 376/272, 347; 250/506.1, 507.1, 515.1, 517.1, 518.1, 496.1, 503.1

(56) References Cited

U.S. PATENT DOCUMENTS

| | | | |
|---|---|---|---|
| 4,299,659 A | * | 11/1981 | Hame et al. |
| 4,356,146 A | * | 10/1982 | Knappe et al. |
| 4,366,114 A | * | 12/1982 | Kuhnel et al. |
| 4,459,260 A | * | 7/1984 | Bradley |
| 4,476,394 A | * | 10/1984 | Muller et al. |
| 4,521,691 A | * | 6/1985 | Christ et al. .............. 250/506.1 |
| 4,713,199 A | * | 12/1987 | Spiker et al. |
| 4,780,269 A | * | 10/1988 | Fischer et al. |
| 4,832,903 A | * | 5/1989 | Ealing |
| 5,753,925 A | * | 5/1998 | Yamanaka et al. |
| 5,862,195 A | * | 1/1999 | Peterson, II ................. 376/272 |
| 6,166,390 A | * | 12/2000 | Quapp et al. |
| 6,430,248 B1 | * | 8/2002 | Shimizu et al. .............. 376/272 |

FOREIGN PATENT DOCUMENTS

| | | | |
|---|---|---|---|
| GB | 2096301 A | * | 3/1981 |
| GB | 2096520 A | * | 3/1981 |
| GB | 2096937 A | * | 3/1981 |
| GB | 2153286 A | * | 8/1985 |
| JP | 5-273392 | * | 5/1993 |
| JP | 5-273392 | | 10/1993 |
| JP | 8-43591 | | 2/1996 |
| JP | 9-113691 | * | 9/1997 |
| JP | 9-166696 | * | 9/1997 |

* cited by examiner

*Primary Examiner*—Micahel J. Carone
*Assistant Examiner*—John Richardson
(74) *Attorney, Agent, or Firm*—Mattingly, Stanger & Malur, P.C.

(57) ABSTRACT

A dry radioactive substance storage facility stores spent fuel assemblies from nuclear power plants. The facility comprises a structure having a storage room storing storage tubes containing spent fuel assemblies. An air inlet duct defining an air inlet passage through which air is supplied into the storage room and a stack defining an air discharge passage through which air from the storage room is discharged outside are connected to the storage room. Radiation shielding members are disposed on the side of the air inlet duct and on the side of the stack, respectively, in the storage room to intercept radiation propagating toward the air inlet passage and the air discharge passage.

8 Claims, 7 Drawing Sheets

DRY RADIOACTIVE SUBSTANCE STORAGE FACILITY

This is a divisional application of U.S. Ser. No. 09/468,317, filed Dec. 21, 1999.

BACKGROUND OF THE INVENTION

The present invention relates to a dry radioactive substance storage facility and, more particularly, to a radioactive substance storage facility for storing radioactive substances including high-level radioactive wastes and radioactive substances produced in nuclear power plants.

Aggregate of radioactive substances used as fuel assemblies in a nuclear power plant is reprocessed to recover fissionable nuclear fuel substances including uranium and plutonium. High-level radioactive wastes resulting from the reprocessing of radioactive substances are vitrified. Since the vitrification of radioactive wastes generates decay heat, the vitrified radioactive wastes must be stored and cooled until the heat generation rate of the radioactive wastes decreases to an extent that permits disposal. Aggregate of radioactive wastes is kept in a storage pool in the nuclear power plant. The amount of aggregates of radioactive substances increases year by year and, eventually, exceeds the capacity of the storage pool of the nuclear power plant. Therefore, it is desired to construct a new storage facility capable of storing a large amount of aggregate of radioactive substances for a long time.

The storage facility disclosed in Japanese Patent Laid-open No. Hei 8-43591 relates to a shielding structure.

A dry radioactive substance storage facility stores vitrified radioactive wastes and aggregate of radioactive substances while cooling the same by air that flows around the same. Dry radioactive substance storage facilities are disclosed in Japanese Patent Laid-open Nos. Hei 5-273392 and Hei 8-43591.

The dry radioactive substance storage facility disclosed in Japanese Patent Laid-open No. Hei 5-273392 has a concrete building having partition walls of a radiation shielding substance and defining a storage room. Many storage tubes are placed in the storage room and aggregates of radioactive substances are contained in the storage tubes. Decay heat generated by the radioactive substances contained in the storage tubes is dissipated into cooling air for cooling. The cooling air flows horizontally through spaces between the storage tubes in a cooling air passage between the ceiling slab and the floor slab of the storage room.

The dry radioactive substance storage facility disclosed in Japanese Patent Laid-open No. Hei 8-43591 is characterized by the use of a heat-resistant resin for forming a structure for enclosing radioactive substances therein.

The dry radioactive substance storage facility disclosed in Japanese Patent Laid-open No. Hei 5-273392 has walls capable of shielding radioactive rays emitted by radioactive substances. However, nothing is mentioned in Japanese Patent Laid-open No. Hei 5-273393 about the improvement of radiation shielding ability.

In the dry radioactive substance storage facility disclosed in Japanese Patent Laid-open No. Hei 8-43591, some of structural members are formed of a substance capable of shielding radioactive rays. Therefore, the number of structures only for radioactive ray interception can be attenuate. However, nothing is mentioned in Japanese Patent Laid-open No. Hei 8-43591 about cooling ability.

In those prior art dry radioactive substance storage facilities, structure is discussed only on the basis of examination of cooling structure or shielding ability, and nothing is discussed on the interception of radioactive rays.

SUMMARY OF THE INVENTION

Accordingly, it is an object of the present invention to provide a dry radioactive substance storage facility capable of improving radioactive ray shielding ability without significantly reducing cooling performance.

With the foregoing object in view, the present invention provides a dry radioactive substance storage facility comprising a plurality of first radiation shielding members disposed in a storage room on the side of an air inlet duct through which air is supplied into the storage room, a plurality of second radiation shielding members disposed in the storage room on the side of an stack through which air is discharged outside, in which first air passages are formed between the first radiation shielding members, and second air passages are formed between the second radiation shielding members.

The air inlet duct can be shielded from radioactive rays by the first radiation shielding members, and the stack can be shielded from radioactive rays by the second radiation shielding members. Accordingly, the amount of radiation reaching the outside through the air inlet duct and the stack is attenuated greatly, whereby the radiation shielding performance of the dry radioactive substance storage facility is improved. Since air flows through spaces between the first and the second radiation shielding members, there is no possibility that the ability to cool the radioactive substance contained in the storage tubes is attenuated significantly.

Preferably, the first and the second radiation shielding members are arranged in a plurality of rows in the flowing direction of air, the first radiation shielding members in the row on the upstream side with respect to the flow of air are disposed opposite to spaces between the first radiation shielding members in the row on the downstream side with respect to the flow of air, and the second radiation shielding members in the row on the downstream side with respect to the flow of air are disposed opposite to spaces between the second radiation shielding members in the row on the upstream side with respect to the flow of air.

Since the first radiation shielding members in the row on the upstream side are disposed opposite to spaces between the first radiation shielding members in the row on the downstream side, the first radiation shielding members on the upstream side are able to intercept radiation through the spaces toward the air inlet duct. Since the second radiation shielding members in the row on the downstream side are disposed opposite to spaces between the second radiation shielding members in the row on the upstream side, the second radiation shielding members on the downstream side are able to intercept radiation propagating through the spaces toward the stack. Thus, the dry radioactive substance storage facility has a further improved radiation shielding ability.

Preferably, the first radiation shielding members are thermally connected to storage tubes on the upstream side of the storage tubes, and the second radiation shielding members are thermally connected to the storage tubes on the downstream side of the storage tubes. Since the radiation shielding members are thermally connected to the storage tubes, the radiation shielding members are cooled by air. Consequently, the reduction of cooling ability due to the partial covering of the storage tubes with the radiation shielding members can be avoided.

Preferably, a plurality of first baffling members are disposed on the side of the air inlet duct in the storage room, a plurality of second baffling members are disposed on the side of the stack in the storage room, and each of the first and the second baffling members comprises a neutron shielding member and a gamma ray shielding member. The first baffling members exercise the same function as the first radiation shielding members, and the second baffling members exercise the same function as the second radiation shielding members. The first and the second baffling members are capable of shielding neutrons and gamma rays.

Preferably, the first and the second baffling members are formed by covering a neutron shielding member with a gamma ray shielding member. Since the neutron shielding member is covered with the gamma ray shielding member, the gamma ray shielding member can easily be attached to the neutron shielding member.

Preferably, upper ones of the plurality of the second baffling members overlap more deeply and are dislocated more greatly toward the stack. Since upper ones of the plurality of the second baffling members overlap more deeply and are dislocated more greatly toward the stack, radiation propagating toward the stack are intercepted by the second baffling members, which enhances the effect of shielding radiation propagating toward the stack.

Preferably, the first baffling members are disposed in an inclined position so as to guide air supplied through the air inlet duct toward an upper region of the storage room. Since the first baffling members are disposed in an inclined position so as to guide air supplied through the air inlet duct toward an upper region of the storage room, the first baffling members utilizes a radiation attenuating function and a radiation reflecting function for shielding radiation. Consequently, the amount of radiation propagating toward the air inlet duct can greatly be attenuated. Part of radiation propagating toward the first baffling members is attenuated as the same permeates the first baffling members, and part of radiation is reflected downward by the inclined first baffling members. Consequently, the amount of radiation propagating toward the air inlet duct can greatly be attenuated.

Preferably, radiation scattering members are disposed in the storage room on the side of the air inlet duct relative to the first radiation shielding members, and on the side of the stack relative to the second radiation shielding members. The radiation scattering members scatters radiation propagated through the spaces between the adjacent baffling members to attenuate the amount of radiation propagating toward the air inlet duct and the stack.

Preferably, each of the radiation scattering members comprises a neutron shielding member and a gamma ray shielding member. Preferably, the radiation scattering member is formed by covering the neutron shielding member with the gamma ray shielding member. Preferably, a surface of the radiation scattering member facing the fuel storage room has a shape to reflect radiation downward.

DETAILED DESCRIPTION OF THE PREFERRED EMBODIMENTS

A dry radioactive substance storage facility removes decay heat generated by radioactive substance stored therein by air flow. Therefore, the dry radioactive substance storage facility needs openings that serve as an air inlet and an air outlet. The greater the openings or the straighter an air passage for air flow, the less flow resistance against air flow and the higher the efficiency of cooling the radioactive substance stored in a storage room. On the other hand, the greater the openings or the straighter an air passage, the less the radiation shielding ability of the dry radioactive substance storage facility. The dry radioactive substance storage facility must be satisfactory in both cooling performance and radiation shielding performance. The inventors of the present invention made studies to cope with both cooling performance and radiation shielding performance and found that both cooling performance and radiation shielding performance can be coped with by disposing radiation shielding members on the inlet and the outlet side of an air passage in the storage room. Dry radioactive substance storage facilities based on findings obtained by studies will be described hereinafter.

Figure 1:
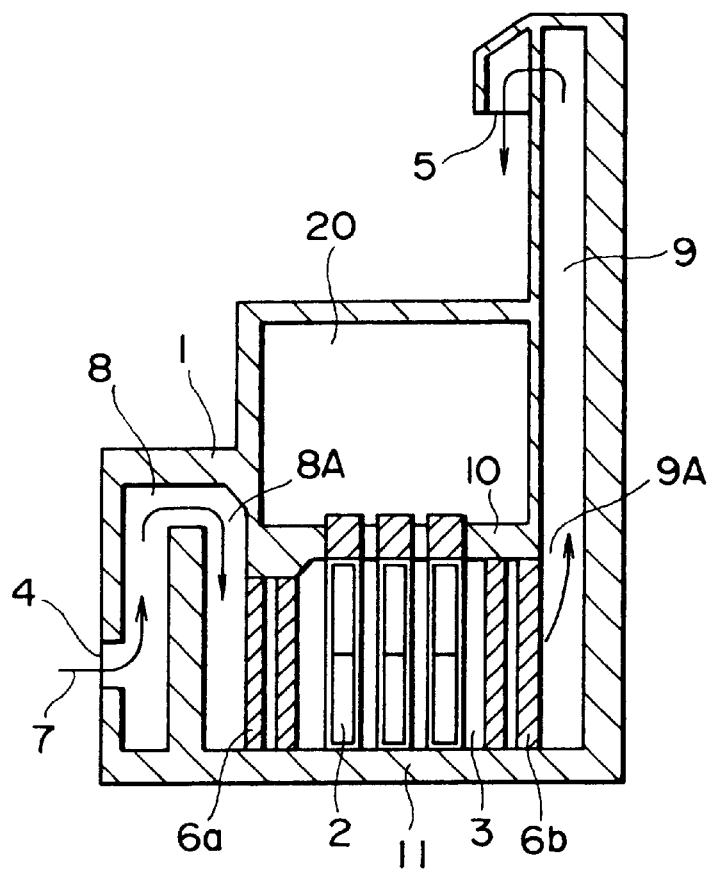
FIG. 1 is a longitudinal sectional view of a dry radioactive substance storage facility in a preferred embodiment according to the present invention.

Referring to FIG. 1, a dry radioactive substance storage facility 1 in a first embodiment according to the present invention stores spent fuel assemblies, i.e., radioactive substance produced in nuclear power plants. The dry radioactive substance storage facility 1 has a building of reinforced concrete construction having a fuel storage room 3. The fuel storage room extends between a ceiling slab 10 and a floor slab 11. Many storage tubes 2 are arranged in the storage room 3 extending under the ceiling slab 10. An air inlet duct 8 has an opening 8A opening into the storage room 3. A stack 9 has an opening 9A opening into the storage room 3. A plurality of radiation shielding members 6A are disposed on the side of the air inlet duct 8 in the storage room 3. A plurality of radiation shielding members 6b are disposed on the side of the stack 9 in the storage room 3. The radiation shielding members 6a and 6b are round rods. The storage tubes 2 are disposed between the radiation shielding members 6a and the radiation shielding members 6b in the storage room 3. The air inlet duct 8 has an air inlet 4 opening outside. The stack 9 has an air outlet 5 opening outside.

The spent fuel assemblies transported from a nuclear power plant to the dry radioactive substance storage facility 1 are handled in a fuel handling room 20 to put the same into the storage tubes 2. The spent fuel assemblies are stored temporarily in the storage tubes 2. Outside air taken through the air inlet 4 into the air inlet duct 8 flows in air flow 7 through the air inlet duct 8 and spaces between the radiation shielding members 6a into spaces between the storage tubes 2. The air flow 7 flowing through the spaces between the storage tubes 2 cools the storage tubes 2 to remove decay heat generated by the spent fuel assemblies contained in the storage tubes 2. The air heated by the decay heat flows through spaces between the radiation shielding members 6b and the stack 9 and is discharged outside through the air outlet 5.

In the dry radioactive substance storage facility 1 thus constructed, the amount of radiation propagating toward the opening of the air passage in the amount of radiation emitted by the spent fuel assemblies contained in the storage tubes 2 is the sum of the amount of radiation propagated directly from the storage tubes 2 and the amount of radiation propagated through the spaces between the radiation shielding members. The ratio between those amounts is dependent on the ratio between a solid angle defined by the opening and the storage tube 2 and a solid angle defined by the radiation shielding member taking into consideration of the transmittance of the radiation shielding members. Accordingly, the amount of radiation that propagates toward the opening can be attenuated by reducing the amount of radiation that passes the spaces between the radiation shielding members or by reducing the solid angle defined by the opening and the storage tube.

Figure 2:
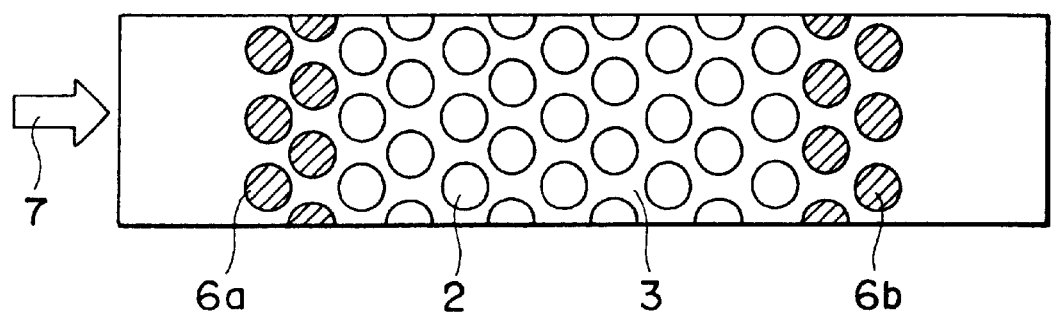
FIG. 2 is a cross-sectional view of a storage room for storing radioactive substance in the radioactive substance storage facility of FIG. 1.

As shown in FIG. 2, the radiation shielding members 6a are arranged in two rows on the side of the air inlet duct, and the radiation shielding members 6b are arranged in two rows on the side of the stack. The radiation shielding members 6a and 6b are arranged in a triangular array arrangement; that is, the radiation shielding members 6a and 6b are arranged on the vertices of equilateral triangles. The radiation shielding members 6a in the upstream row are disposed so as to cover spaces between the radiation shielding members 6a in the downstream row. The radiation shielding members 6b in the downstream row are disposed so as to cover spaces between the radiation shielding members 6b in the upstream row.

Part of radiation emitted by the spent fuel assemblies contained in the storage tubes 2 and propagating toward the opening 8A is absorbed and attenuated by the radiation shielding members 6a disposed on the side of the storage tubes 2, and the rest propagates through the spaces between the radiation shielding members 6a disposed on the side of the storage tubes 2 and is attenuated by the radiation shielding members 6a disposed on the side of the opening 8A. Since the solid angle directly including the storage tubes 2 as viewed from the opening 8A is small, the amount of radiation that propagates directly toward the opening 8A without being obstructed by the radiation shielding members 6a can greatly be attenuated.

Part of radiation by the spent fuel assemblies contained in the storage tubes 2 and propagating toward the opening 9A is absorbed and attenuated by the radiation shielding members 6b disposed on the side of the storage tubes 2, and the rest propagates through the spaces between the radiation shielding members 6b disposed on the side of the storage tubes 2 and is attenuated by the radiation shielding members 6b disposed on the side of the opening 9A. Since the solid angle directly including the storage tubes 2 as viewed from the opening 9A is small, the amount of radiation that propagates directly toward the opening 9A without being obstructed by the radiation shielding members 6b can greatly be attenuated.

Thus, the amount of radiation by the spent fuel assemblies stored in the storage room 3 and propagating toward the openings 8A and 9A can greatly be attenuated and, consequently, the amount of radiation that propagates through the air inlet 4 and the air outlet 5 outside the dry radioactive substance storage facility 1 can greatly be attenuated.

The radiation shielding members 6a and 6b disposed on the upstream and the downstream side of the storage tubes 2 increase resistance against air flow. The increment of the resistance can be limited to a small value by forming the radiation shielding members 6a and 6b in the same cross-sectional shape as the storage tubes 2. Consequently, the amount of radiation that propagates toward the openings 8A and 9A can greatly be attenuated without involving significant reduction in air-cooling performance.

The radiation shielding performance of the radiation shielding members shown in FIG. 2 will be explained in connection with Expression (1). Expression (1) represents the relation between the thickness a of the radiation shielding members, i.e., the size along the direction of propagation of radiation, and the amount of radiation transmitting the radiation shielding members.

$$\frac{\mu}{\mu_0} \cong \exp[-\sigma_a(E) \cdot a] \qquad (1)$$

where a is the thickness of the radiation shielding members along the direction of propagation of radiation, $\sigma_a(E)$ is the absorption coefficient of the radiation shielding members with radiation having energy E, $\mu_0$ is the amount of radiation before transmitting the radiation shielding members and $\mu$ is the amount of radiation transmitting the radiation shielding members.

It is known from Expression (1) that the thicker radiation shielding members have higher radiation shielding ability. The thickness of the radiation shielding members necessary to secure the least necessary radiation shielding ability can be determined by using Expression (1).

The upstream side surfaces of the radiation shielding members 6a and 6b employed in this embodiment are curved so that the level of resistance exerted by the radiation shielding members 6a and 6b against the air flow is low and pressure loss in the air passage is low. Forming the downstream side surfaces of the radiation shielding members 6a and 6b in a curved surface is also effective in reducing pressure loss in the air passage.

Figure 3:
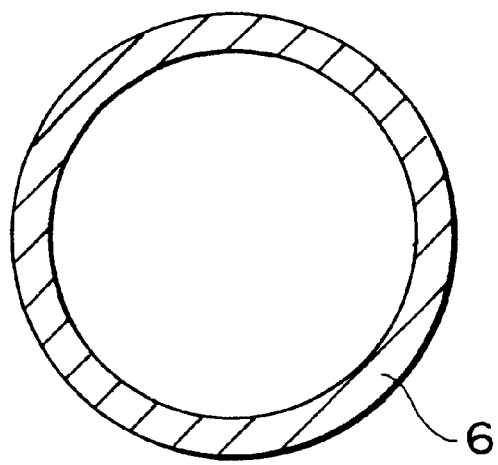
FIG. 3 is a cross-sectional view of a radiation shielding member.

Referring to FIG. 3, a radiation shielding member 6 in a modification has the shape of a round tube. The wall thickness a of the radiation shielding member 6 is a thickness necessary to secure necessary radiation shielding effect determined by using Expression (1). The radiation shielding ability of the radiation shielding member 6 having the shape of a round tube is equivalent to that of the radiation shielding members having the shape of a rod.

Figure 4:
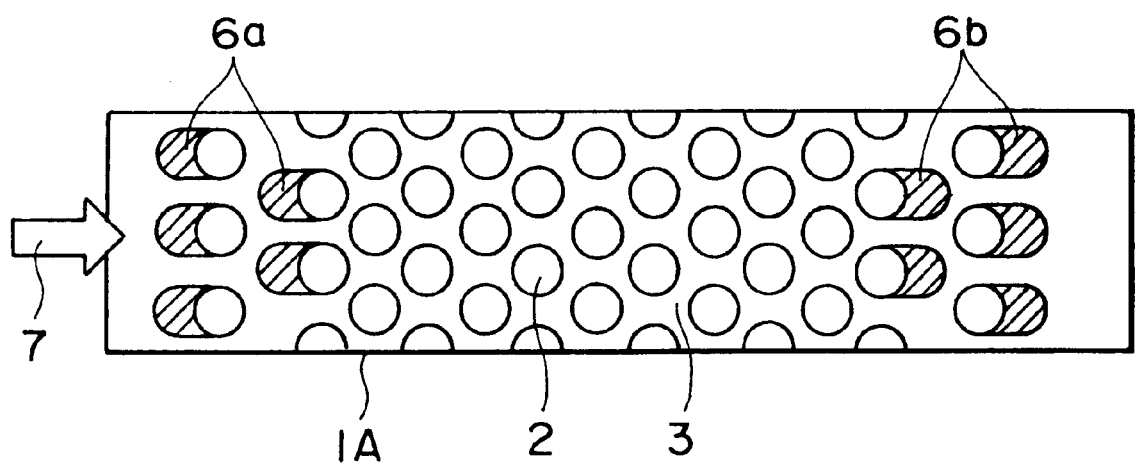
FIG. 4 is a cross-sectional view of a storage room in a dry radioactive substance storage facility in a second embodiment according to the present invention.

A radioactive substance storage facility 1A in a second embodiment according to the present invention will be described with reference to FIG. 4. As shown in FIG. 4, radiation shielding members 6a are attached to the upstream side surfaces of storage tubes 2, and radiation shielding members 6b are attached to the downstream side surfaces of the storage tubes 2. The storage tubes 2 combined with the radiation shielding members 6a are arranged in two rows adjacent to an opening 8A, and the storage tubes 2 combined with the radiation shielding members 6b are arranged in two rows adjacent to an opening 9A. The second embodiment, similarly to the first embodiment shown in FIG. 1, is capable of greatly reducing the amount of radiation that reaches the openings 8A and 8B.

The heat removing ability of the storage tubes 2 combined with the radiation shielding members will be examined. Increase in temperature on the surface of the storage tube 2 due to the attachment of the radiation shielding member to the storage tube 2 is expressed by Expression (2).

$$\Delta\theta = \frac{\delta}{\lambda} Q \quad (2)$$

where $\Delta\theta$ is increase in temperature, $\delta$ is the thickness of the radiation shielding member and $\lambda$ is the thermal conductivity of the radiation shielding member.

Figure 5:
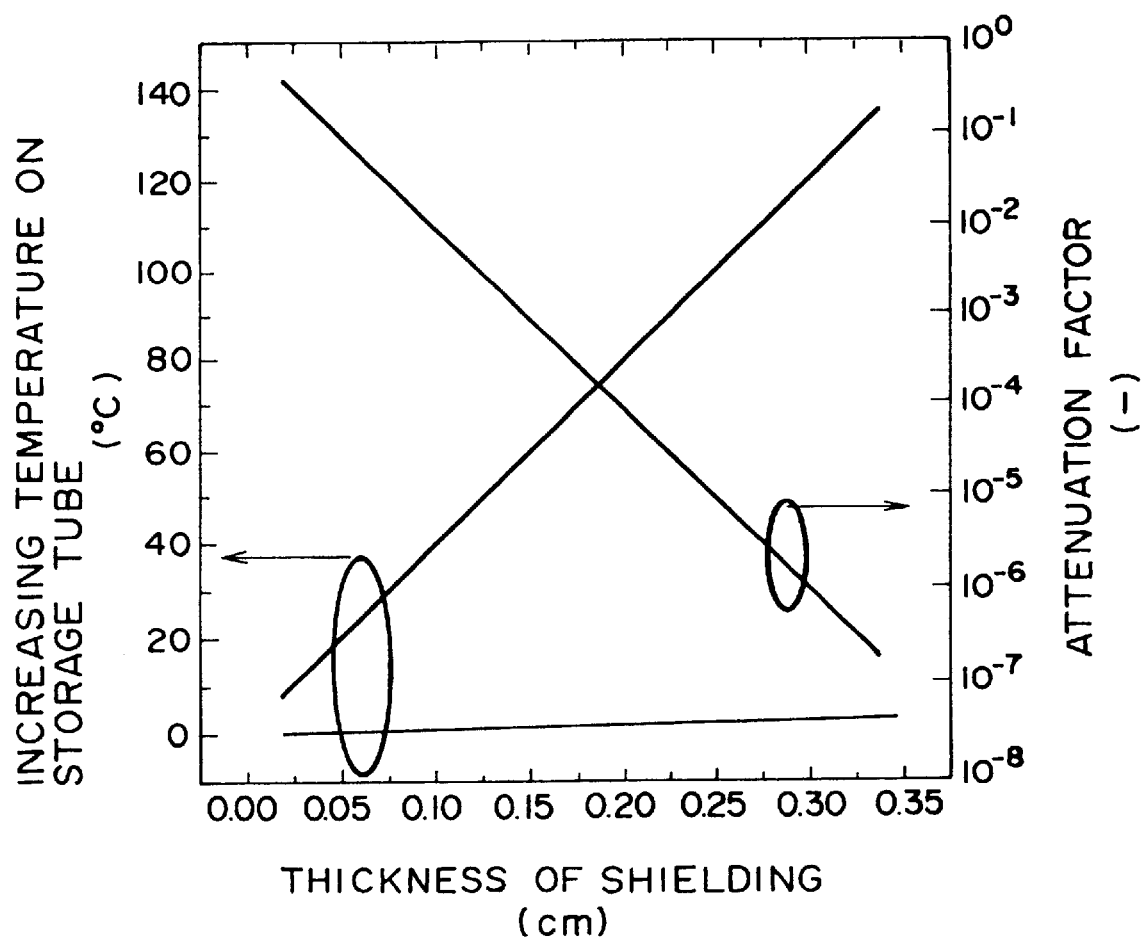
FIG. 5 is a diagram showing the dependence of surface increase in temperature in storage tubes and radiation attenuation ratio on the thickness of a radiation shielding member.

The radiation shielding ability and the heat removing ability of the storage tube 2 combined with the radiation shielding member were calculated by using Expressions (1) and (2), in which it was assumed that the energy of radiation is 1 MeV and the radiation shielding member is made of iron. Calculated values are shown in FIG. 5. It is known from FIG. 5 that the radiation attenuation ratio is about 1/100 when the thickness of the radiation shielding member is 10 cm and gamma rays of 1 MeV in energy is radiated. Heat generated by the spent fuel assemblies is transmitted through the storage tube 2 to the radiation shielding member. Increase in temperature of the surface of the storage tube 2 is about 0.1° when the heat flux across the radiation shielding member is 100 W/m, and is about 1° when 1 kW/m. Therefore, increase in temperature of the storage tube 2 is small and the reduction of the heat removing ability of the storage tube 2 is small when the energy of radiation or heat flux is on the level as mentioned above.

The second embodiment has the following effects. Since the radiation shielding members of the second row are joined to the storage tubes to eliminate spaces between them, the storage room 3 can be formed in a short length, i.e., a size along the direction of flow of air.

Figure 6:
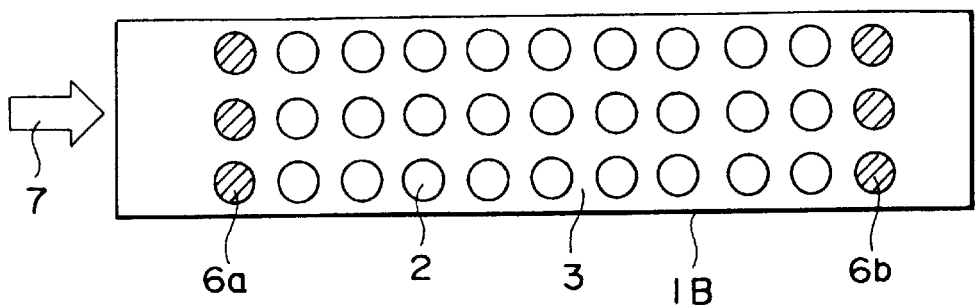
FIG. 6 is a cross-sectional view of a storage room in a dry radioactive substance storage facility in a third embodiment according to the present invention.

A dry radioactive substance storage facility 1B in a third embodiment according to the present invention will be described with reference to FIG. 6. In the radioactive substance storage facility 1B, storage tubes 2 are arranged in lines and rows in a storage room 3. Radiation shielding members 6a are arranged in a single row on the side of an opening 8A so as to correspond directly to the adjacent storage tubes 2, respectively. Radiation shielding members 6b are arranged in a single row on the side of an opening 9A so as to correspond directly to the adjacent storage tubes 2, respectively. The radioactive substance storage facility 1B in the third embodiment differs from the radioactive substance storage facility 1 in the first embodiment in the arrangement of the storage tubes 2. Although the dry radioactive substance storage facility in the third embodiment attenuates the amount of radiation reaching the openings 8A and 9A by the radiation shielding members 6a and 6b more effectively than the conventional dry radioactive substance storage facility, the amount of radiation reaching the openings 8A and 9A in the dry radioactive substance storage facility 1B in the third embodiment is greater than that in the dry radioactive substance storage facility 1 in the first embodiment.

Figure 7:
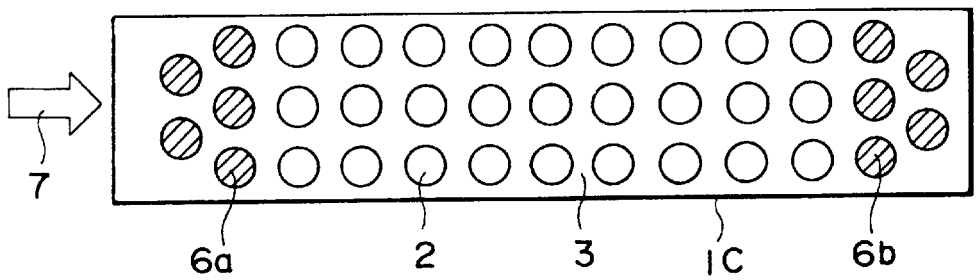
FIG. 7 is a cross-sectional view of a storage room in a dry radioactive substance storage facility in a fourth embodiment according to the present invention.

A dry radioactive substance storage facility 1C in a fourth embodiment according to the present invention will be described with reference to FIG. 7. In a storage room 3 of the radioactive substance storage facility 1C, storage tubes 2 are arranged, similarly to those of the dry radioactive substance storage facility 1B, in lines and rows. Radiation shielding members 6a on the side of an opening 8A are arranged in two rows in a triangular array arrangement. Radiation shielding members 6b on the side of an opening 9A are arranged in two rows in a triangular array arrangement. The dry radioactive substance storage facility 1C is the same in effect as the dry radioactive substance storage facility 1.

Figure 8:
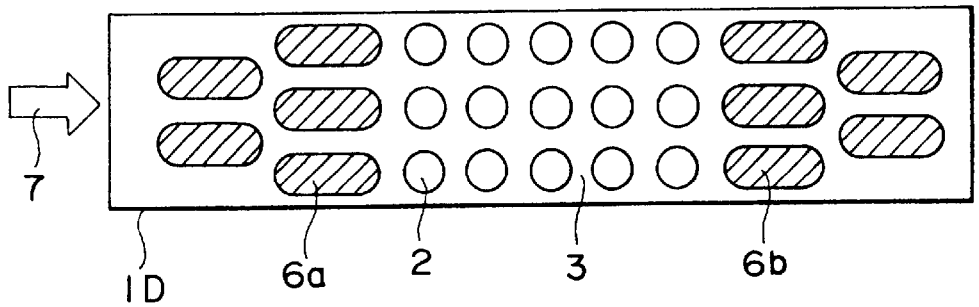
FIG. 8 is a cross-sectional view of a storage room in a dry radioactive substance storage facility in a fifth embodiment according to the present invention.

A dry radioactive substance storage facility 1D in a fifth embodiment according to the present invention will be described with reference to FIG. 8. Radiation shielding members 6a and 6b are arranged in two rows in a triangular array arrangement in a storage room 3 of the dry radioactive substance storage facility 1D. The radiation shielding members 6a and 6b have an oval cross section elongated in the direction of air flow 7. The dry radioactive substance storage facility 1D is the same in effect as the dry radioactive substance storage facility 1. The radiation shielding members 6a and 6b in the fifth embodiment elongated in the direction of air flow 7 have increased radiation attenuating effect. Therefore, the amount of radiation reaching the openings 8A and 9A in the dry radioactive substance storage facility 1D is less than that in the dry radioactive substance storage facility 1.

Figure 9:
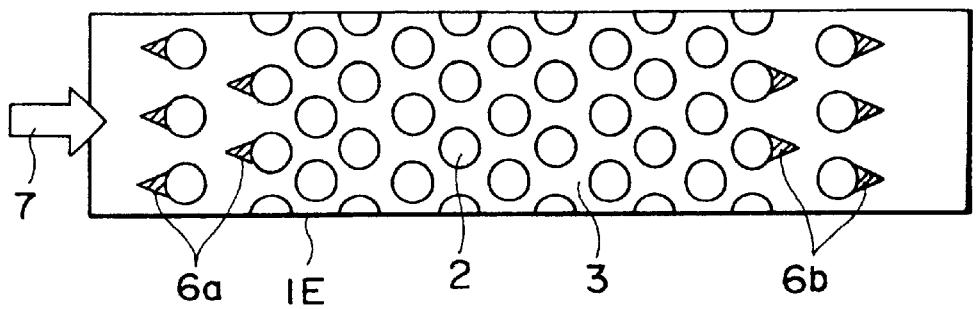
FIG. 9 is a cross-sectional view of a storage room in a dry radioactive substance storage facility in a sixth embodiment according to the present invention.

A dry radioactive substance storage facility 1E in a sixth embodiment according to the present invention will be described with reference to FIG. 9. Storage tubes 2 are arranged in a storage room 3 of the dry radioactive substance storage facility 1E in an arrangement similar to that of the storage tubes 2 of the dry radioactive substance storage facility 1A. Radiation shielding members 6a, similarly to those of the dry radioactive substance storage facility 1A shown in FIG. 4, are attached to the upstream side surfaces of the storage tubes 2 in two rows adjacent to an opening 8A. Radiation shielding members 6b, similarly to those of the dry radioactive substance storage facility 1A, are attached to the downstream side surfaces of the storage tubes 2 in two rows adjacent to an opening 9A. The radiation shielding members 6a and 6b have a wedge-shaped cross section. The dry radioactive substance storage facility 1E is the same in effect as the dry radioactive substance storage facility 1A. Since the radiation shielding members have a wedge-shaped cross section, the radiation shielding members 6a are disposed with their edges directed in a direction opposite the direction of air flow 7 and the radiation shielding members 6b are disposed with their edges direction in the direction of air flow 7, the radiation shielding members 6a and 6b exert less resistance against the air flow 7.

Figure 10:
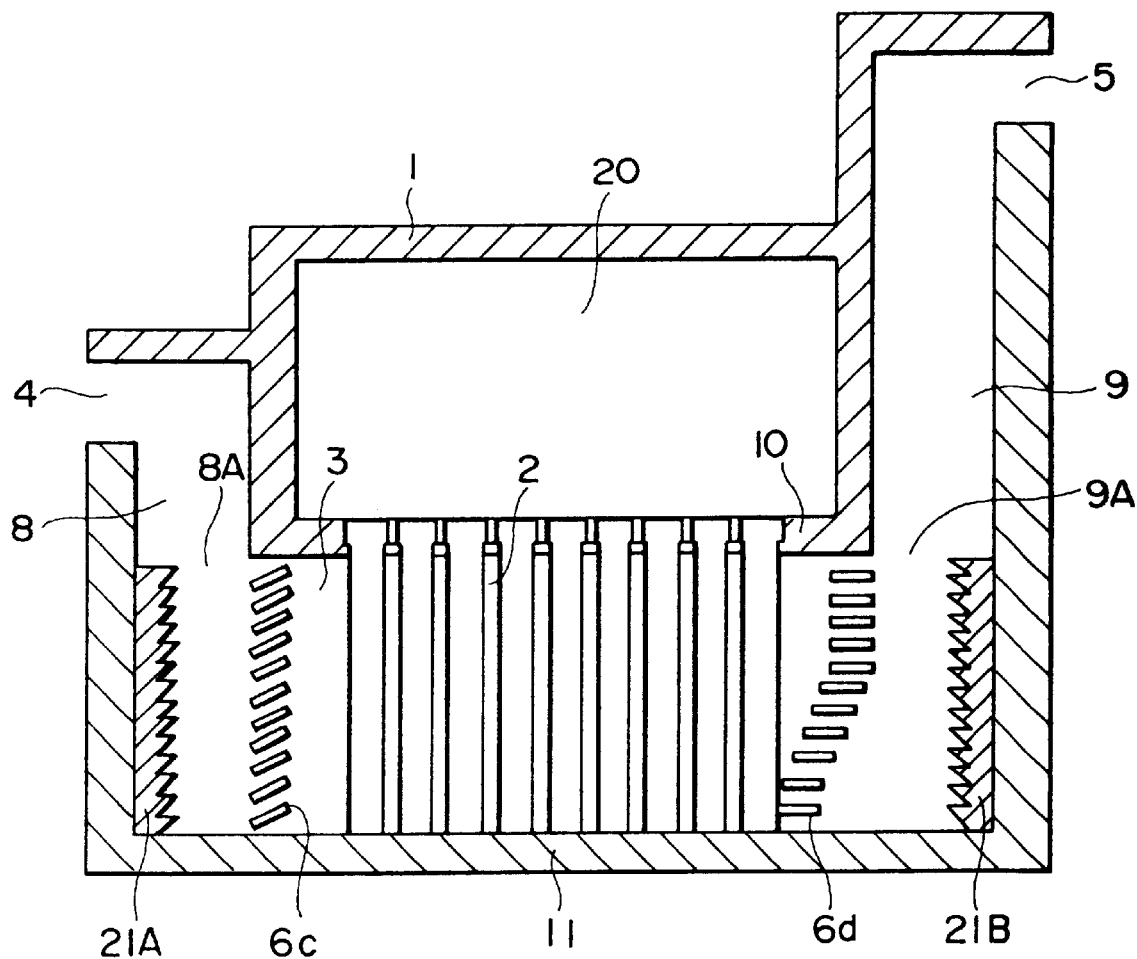
FIG. 10 is a sectional view of a dry radioactive substance storage facility in a seventh embodiment according to the present invention.

A dry radioactive substance storage facility 1F in a seventh embodiment according to the present invention will be described with reference to FIG. 10. The dry radioactive substance storage facility 1F has a building of reinforced concrete institution having a fuel storage room 3. Only matters relating to the dry radioactive substance storage facility 1F different from those of the dry radioactive substance storage facility 1 will be described. A plurality of baffling plates 6d are arranged in the storage room 3 near an air inlet duct. A plurality of baffling plates 6d are arranged in the storage room 3 near a stack. Radiation scattering members 21A is disposed on the side of the air inlet duct with respect to the baffling plates 6c and is attached to a side wall of the storage room 3, facing the baffling plates 6c. Radiation scattering member 21B is disposed on the side of the stack with respect to the baffling plates 6d and is attached to a side wall of the storage room 3, facing the baffling plates 6d.

Figure 11:
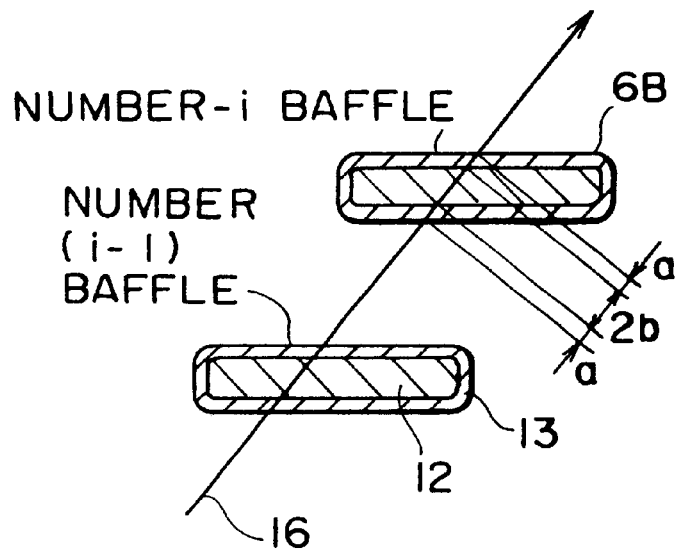
FIG. 11 is a sectional view of baffling plates included in the dry radioactive substance storage facility of FIG. 10.

As shown in FIG. 11, each of the baffling plates 6c and 6d is formed by covering a neutron shielding member 12 with a gamma ray shielding member 13. The neutron shielding member 12 is made of a stainless steel containing a neutron absorbing substance, such as boron. The stainless steel containing boron is strong and is suitable for forming the structural member of the baffling plate. The neutron shielding member 12 may be formed of a substance containing iron, such as a carbon steel. The gamma ray shielding member 13 may be formed of a hydrogen compound, such as a hydrocarbon.

The baffling plates 6c and 6d are arranged vertically so as to overlap each other between the ceiling slab 10 and the floor slab 11. Some of the baffling plates 6d are arranged so that upper ones are shifted toward the stack relative to the lower ones. The baffling plates 6c are inclined upward toward the storage tubes 2.

Figure 12:
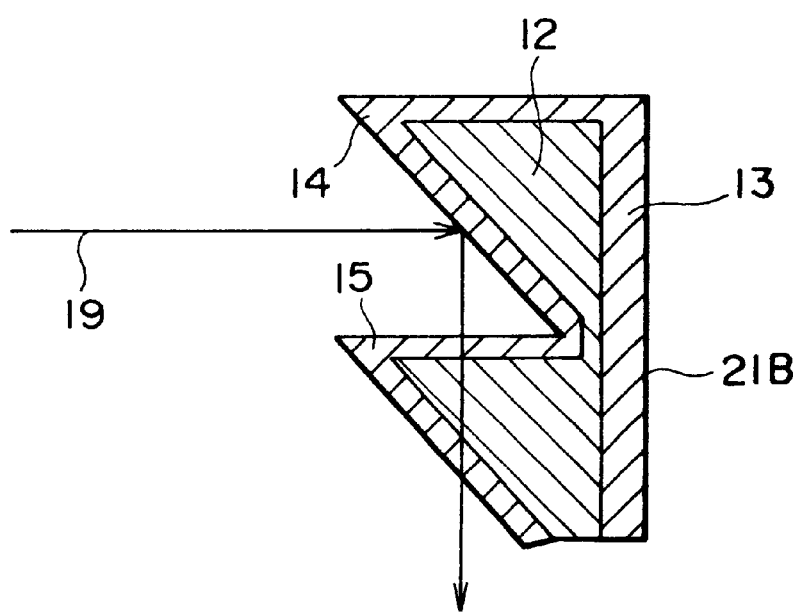
FIG. 12 is a fragmentary sectional view of a radiation scattering member included in the dry radioactive substance storage facility of FIG. 10.

As shown in FIG. 12, the radiation scattering member 21B, similarly to the baffling plates 6c and 6d, is formed by covering a neutron shielding member 12 with a gamma ray shielding member 13. The radiation scattering member 21A is the same in construction as the radiation scattering member 21B. Each of the radiation scattering members 21A and 21B has inclined surfaces 14 facing obliquely downward and horizontal surfaces 15 facing upward on its side facing the baffling plates. The inclined surfaces 14 and the horizontal surfaces 15 form a sawtoothed side surface.

Air supplied through the air inlet duct 8 flows through spaces between the baffling plates 6c into spaces between the storage tubes 2 disposed in the storage room 3. The air flowing through the spaces between the storage tubes 2 cools the storage tubes 2 and removes decay heat generated by the spent fuel assemblies contained in the storage tubes 2. The air heated by decay heat flows through spaces between the baffling plates 6d and the stack 9 and is discharged outside.

The baffling plates 6c and 6d formed by combining the neutron shielding member 12 and the gamma ray shielding member 13 are capable of shielding neutrons and gamma rays. Thus, the baffling plates 6c and 6d has a radiation shielding function to intercept neutrons and gamma rays. Therefore, the baffling plates need not be arranged at small intervals and hence do not cause pressure loss. Therefore, cooling ability to cool the spent fuel assemblies contained in the storage tubes 2 is not attenuated by the baffling plates 6c and 6d and radiation can be intercepted efficiently. Since the neutron shielding member 12 is covered with the gamma ray shielding member 13, the gamma ray shielding member 3 can be easily fixed to the neutron shielding member 12. For example, the gamma ray shielding member 13 may be attached to the surface to the neutron shielding member 12 via an adhesive. The baffling plates 6c and 6d correspond to the radiation shielding members 6a and 6b used in the dry radioactive substance storage facility 1, respectively.

Radioactive rays (neutrons and gamma rays) emitted by the spent fuel assemblies stored in the storage room 3 are intercepted by concrete walls defining the storage room 3 including the ceiling slab 10 and the floor slab 11. Radiation that propagate toward the stack 9 is intercepted by the baffling plates 6d. The baffling plates 6d formed by combining the neutron absorbing member and the gamma ray absorbing member are capable of efficiently shielding neutrons and gamma rays. The radiation shielding function of the baffling plates 6d will be described with reference to FIG. 11 typically showing the baffling plates 6d, and radiation 16 (including neutrons and gamma rays) propagating obliquely upward and falling on the baffling plates 6d. The radiation shielding ability of the baffling plate 6d is expressed by:

$$\frac{\mu}{\mu_0} \cong \exp[-1 \times 2\{\sigma_a(E) \cdot a + \sigma_b(E) \cdot b\}] \quad (3)$$

where b is the thickness of the neutron shielding member 12 of the baffling plate 63 along the path of the radiation 16, a is the thickness of the gamma ray shielding member 13 along the path of the radiation 16, $\mu_0$ is the amount of energy of the radiation 16 before transmitting the baffling plate 6B, $\mu$ is the amount of energy of the radiation 16 transmitting throgh the baffling plate 6B, $\sigma_b$ is the absorption coefficient of the neutron shielding member 12 to the radiation 16 having energy E, and $\sigma_a$ is the absorption coefficient of the gamma ray shielding member 13 to the radiation 16. As obvious from Expression (3), the radiation shielding ability increases with the increase in the thicknesses of the neutron shielding member 12 and the gamma ray shielding member 13. Since the baffling plates 6d are arranged vertically so as to overlap each other and some of the baffling plates 6d are arranged so that upper ones are shifted toward the stack relative to the lower ones, the radiation 16 propagating obliquely upward are intercepted by the plurality of baffling plates 6d. Accordingly, the radiation (neutrons and gamma rays) propagating toward the stack 9 can efficiently be intercepted.

Figure 13:
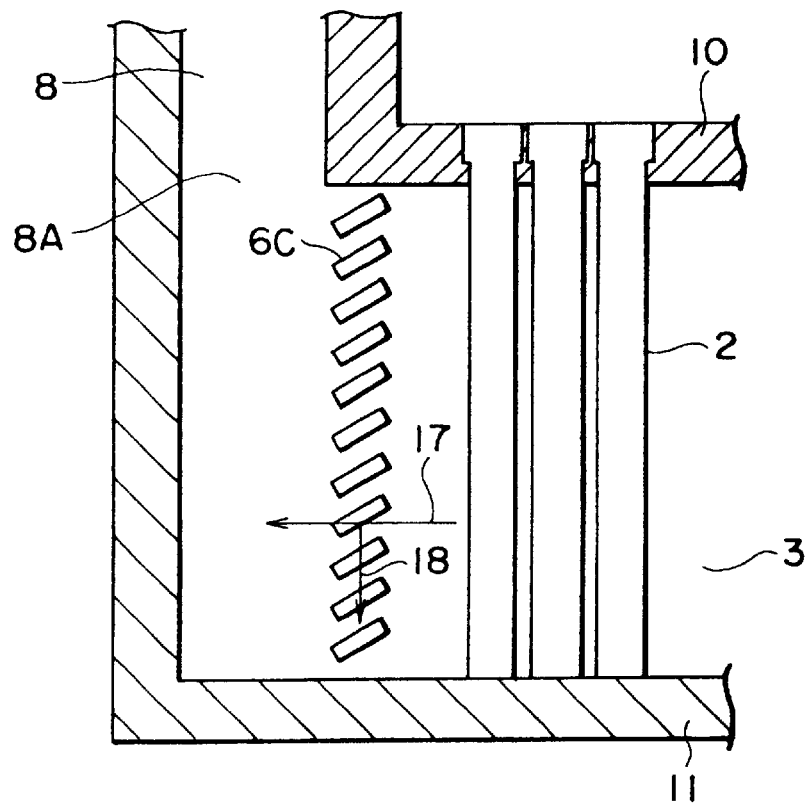
FIG. 13 is a fragmentary, longitudinal sectional view of an air inlet duct and associated parts in the radioactive substance storage facility of FIG. 10.

Since the baffling plates 6c are inclined upward toward the storage tubes 2, air is supplied into an upper region of the storage room 3 in which the temperature is high, the temperature of the storage room 3 can be lowered. The shielding ability of the baffling plates 6c will be described. Part of radiation 17 propagating toward the baffling plates 6c and trying to penetrate the baffling plates 6c is attenuated by the baffling plates 6c, and part of the radiation 17 is reflected downward by the inclined surfaces of the baffling plates 6c as shown by numeral 18 in FIG. 13, the radiation 18 reflected downward being attenuated by the lower baffling plates 6c. The radiation reflected by the inclined baffling plates 6c does not propagate toward the air inlet duct 8 and propagate downward necessarily. The baffling plates 6c exercise both a radiation attenuating function and a radiation reflecting function, whereby the radiation propagating toward the air inlet duct 8 is attenuated significantly.

The function of the radiation scattering member 21B will be explained. The radiation 17 propagated through spaces between the baffling plates 6d is attenuated by the neutron shielding member 12 and the gamma ray shielding member 13 of the radiation scattering member 21B. Part of radiation 19 falling on the inclined surfaces 14 is reflected downward and is attenuated by lower portions of the radiation scattering member 21B below the inclined surfaces 14 reflecting the radiation 19 or by the floor slab 11. Because the radiation scattering member 21B does not reflect the radiation upward, the amount of the radiation propagating toward the stack 9 is further attenuated. Since the radiation scattering member 21B is disposed in an inherently dead space through which air flows scarcely, the radiation scattering member 21B does not increase pressure loss in the air passage and does not attenuate the ability to cool the spent fuel assemblies. Since the radiation scattering member 21B is formed by covering the neutron shielding member 12 with the gamma ray shielding member 13, similarly to the baffling plates, the gamma ray shielding member 13 can simply be attached to the neutron shielding member 12. The radiation scattering member 21A is the same in function as the radiation scattering member 21B and attenuates the amount of radiation that propagates toward the air inlet duct 8.

Figure 14:
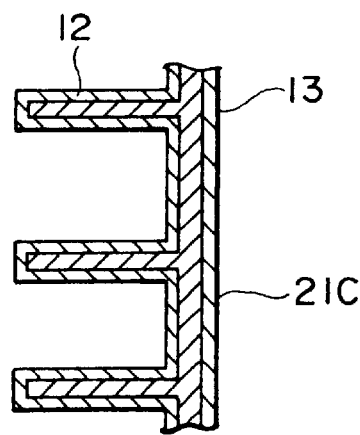
FIG. 14 is a fragmentary sectional view of a modification of the radiation scattering member.

Referring to FIG. 14, a radiation scattering member 21C in a modification has a surface facing the baffling plates and having the shape of comb teeth. The radiation scattering member 21C is formed, similarly to the radiation scattering members 21A and 21B, by covering a neutron shielding member 12 with a gamma ray shielding member 13.

Although the present invention has been described in its preferred embodiments as applied to cooling the storage tubes 2 containing the spent fuel assemblies, the present invention is effectively applicable also to storing vitrified radioactive wastes instead of the spent fuel assemblies.

What is claimed is:

1. A dry radioactive substance storage facility comprising:
    a structure having a storage room storing storage vessels containing radioactive substance;
    an air inlet duct having an air inlet and defining an air inlet passage through which air is supplied into the storage room;
    a stack having an air outlet and defining an air discharge passage through which air from the storage room is discharged outside, wherein the storage room is defined by a ceiling, a floor, and side walls connected to the ceiling and floor and extending from the air inlet duct to the stack;
    a plurality of first radiation shielding members disposed in the storage room between the ceiling of the storage room and the floor of the storage room, between the walls of the storage room, and between the storage vessels and the air inlet duct; and
    a plurality of second radiation shielding members disposed in the storage room between the ceiling of the storage room and the floor of the storage room, between the walls of the storage room, and between the storage vessels and the stack;
    wherein the storage vessels are arranged between the first radiation shielding members and the second radiation shielding members, first air passages which are connected with the air inlet passage are formed between the first radiation shielding members, and the second air passages which are connected with the air discharge passage are formed between the second radiation shielding members.

2. The dry radioactive substance storage facility according to claim 1, wherein the first radiation shielding members are arranged in a plurality of rows arranged in a direction in which air flows and the second radiation shielding members are arranged in a plurality of rows arranged in the direction in which air flows, the first radiation shielding members in the row on an upstream side with respect to the direction of flow of air are disposed opposite to spaces between the first radiation shielding members in the row on a downstream side with respect to the direction of flow of air, and the second radiation shielding members in the row on a downstream side with respect to the direction of flow of air are disposed opposite to spaces between the second radiation shielding members in the row on the upstream side with respect to the direction of flow of air.

3. The dry radioactive substance storage facility according to claim 1, wherein the first radiation shielding members are thermally connected to the storage vessels on the upstream side of the storage vessels, and the second radiation shielding members are thermally connected to the storage vessels on the downstream side of the storage vessels.

4. The dry radioactive substance storage facility according to claim 2, wherein the first radiation shielding members are thermally connected to the storage vessels on the upstream side of the storage vessels, and the second radiation shielding members are thermally connected to the storage vessels on the downstream side of the storage vessels.

5. The dry radioactive substance storage facility according to claim 1, further comprising radiation scattering members disposed on the side of the air inlet passage relative to the first radiation shielding members and on the side of the air discharge passage relative to the second radiation shielding members, respectively, in the storage room.

6. The dry radioactive substance storage facility according to claim 5, wherein each of the radiation scattering members comprises a neutron shielding member and a gamma ray shielding member.

7. The dry radioactive substance storage facility according to claim 6, wherein each of the radiation scattering members is formed by covering the neutron shielding member with the gamma ray shielding member.

8. The dry radioactive substance storage facility according to claim 5, wherein a surface of each of the radiation scattering members facing the storage room is formed in a shape capable of reflecting radiation downward.

* * * * *